Figure 1:
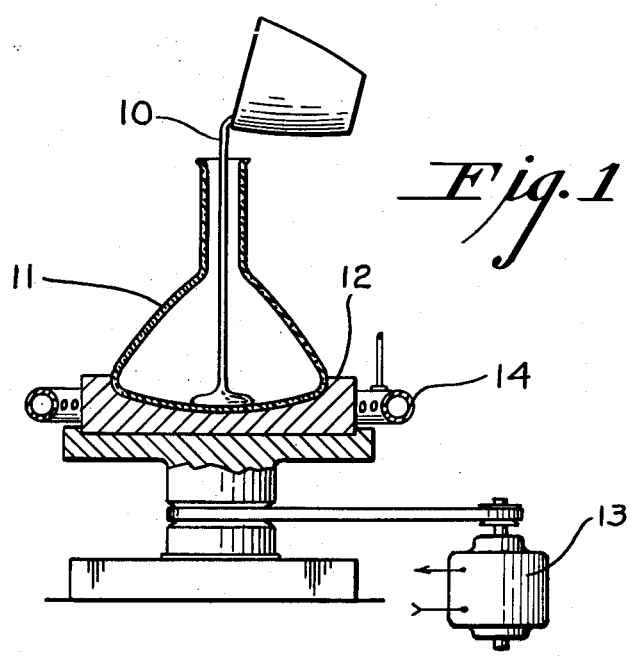

May 1, 1956  R. H. DALTON ET AL  2,744,034
METHOD OF FLASHING GLASS ARTICLES
Filed March 7, 1952

LAMP BULB

FLASHED GLASS LAYER

INVENTORS
ROBERT H. DALTON
AND RAYMOND O. VOSS
BY
ATTORNEY.

United States Patent Office 2,744,034
Patented May 1, 1956

2,744,034

METHOD OF FLASHING GLASS ARTICLES

Robert H. Dalton and Raymond O. Voss, Corning, N. Y., assignors to Corning Glass Works, Corning, N. Y., a corporation of New York Application March 7, 1952, Serial No. 275,378

5 Claims. (Cl. 117—97)

This invention relates generally to the manufacture of colored hollow glass articles and is particularly concerned with an improved method for making colored glass lamp bulbs and the like.

Prior methods of making such colored glass articles as lamp bulbs include fabrication of the article from a single colored glass, application of a bonded or fused-on pigmented coating to either the inner surface or the outer surface of a preshaped hollow glass form, staining of a preshaped clear hollow glass form, and the double gathering of a colored molten glass and a clear molten glass to form a hollow shape composed of a colored layer and a colorless layer.

The demand for colored hollow glass articles and in particular for colored lamp bulbs being generally relatively small, the production of such articles from a single colored glass whether by automatic machinery or by hand is economically unattractive in that mechanical production, in order to be commercially practicable, must be on a large scale and hence requires large tonnage melting while hand production inherently involves high labor costs.

A colored pigmented coating bonded or fused to the surface of a hollow colorless glass article such as a lamp bulb is much less resistant to abrasion and to chemical attack than the bulb itself. Such a coating, when applied to the outer surface of a bulb, for example, is susceptible to abrasion in handling and to attack by the atmosphere and other agencies and eventually becomes unsightly in appearance. Furthermore, the application of such a coating to the inner surface of a bulb has met with no practical success to date.

Coloration of a hollow glass article by staining it with copper or silver requires many time-consuming steps including coating the article with a staining paste, heating the coated article, cooling it and removing the residual staining paste and reheating the article in a reducing atmosphere. Moreover the range of colors which can be produced by staining is limited to red, amber and yellow.

Production of a colored hollow glass article by double gathering, sometimes designated "flashing," can be accomplished only by hand with the usual attendant high labor costs. The first gather conventionally comprises a colored glass, which thus becomes the inner layer of the article, because it is more difficult to make the colored layer uniform in thickness and appearance if it is not gathered first. While satisfactory colored hollow glass articles can be made by this procedure, for reasons of economy double gathering is conventionally restricted to the production of those articles utilizing strongly colored glasses, such as copper ruby and cobalt blue glasses, and to items that command a good price.

We have now discovered a simple and economical procedure for producing colored hollow glass articles having the appearance and durability of flashed or solid color hollow articles without the attendant disadvantages of the previously available methods. Specifically such method comprises heating a previously formed hollow clear glass article to a temperature between its strain point and its softening point, depositing on the inner surface of such article centrally of the area to be coated a quantity of a colored molten glass having a softening point below the annealing point of the glass article and an expansion coefficient not differing by more than $10 \times 10^{-7}$ per ° C. from that of the glass article, the viscosity of the molten glass being not over about 100 poises, and rotating the article about an axis passing centrally through such area to cause the molten glass to flow under the influence of centrifugal force and to spread over such area.

The practice of the instant invention is subject to the following considerations:

In order to avoid breakage from thermal shock, the hollow clear glass article should be preheated to a temperature above its strain point before contact with the molten glass. It should not, however, be preheated so close to its softening point as to cause it to become distorted. (The strain point is that temperature at which the viscosity is in the neighborhood of $4.0 \times 10^{14}$ poises and below which permanent strain cannot be introduced into the glass. The softening point is that temperature at which the viscosity is in the neighborhood of $4.5 \times 10^{7}$ poises and at which the glass begins to noticeably deform under its own weight.)

The molten glass which is to form the flashed layer should preferably have a softening point sufficiently below the annealing point of the glass article so that it can be maintained in a molten condition in contact with the article without causing excessive deformation or warping of the latter. (The annealing point is that temperature at which the viscosity is in the neighborhood of $2.5 \times 10^{13}$ poises and at which internal strains can be quickly relieved.) In practice it is desirable to prevent deformation by providing a support that fits the contour of the glass article. The initially low viscosity of the molten glass should remain low enough to permit satisfactory flow under centrifugal force after the heat losses which occur during its transfer to the article. At the same time the temperature at which the initial viscosity is atained should not be more than sufficient to compensate for such losses. The initial viscosity of the molten glass before its transfer to the article should not exceed about 100 poises and preferably should be about 2 poises.

The initial temperature of the molten glass may vary inversely with the temperature to which the hollow clear glass article is preheated and it may vary directly with the wall thickness of the article and with the time required to transfer the molten glass thereto. The heat content of the deposited molten glass however should not be any greater than necessary to secure proper flow so as to minimize the tendency for deformation.

Practically any colored glass which meets these requirements can be used as the molten glass. Base glasses with which a suitable color-forming constituent can be compounded and which are particularly suitable for use with hollow articles of a soda-lime silicate glass, such as lamp bulbs, are described in the pending application of R. H. Dalton, Serial Number 651,818, filed March 4, 1946, issued June 23, 1953, as Patent No. 2,643,020 and comprise essentially 60% to 85% PbO, 5% to 15% Al$_2$O$_3$, and at least one glass-forming oxide in the indicated proportion selected from the group consisting of up to 40% B$_2$O$_3$ and up to 20% SiO$_2$, the sum of such essential oxides being over 80%. Such glasses have expansion coefficients between 70 and $90 \times 10^{-7}$ per °C. (between 0° and 300° C.) and softening points from about 430° to 500° C. A specific composition within this range, which has a softening point of 440° C. and an expansion coefficient of $84 \times 10^{-7}$ per °C. and which is especially desirable for use with articles of a soda-lime silicate glass, consists approximately of 75% PbO, 11% $Al_2O_3$, 11% $B_2O_3$ and 3% $SiO_2$. Such base glasses may be colored by adding to their batches one or more of the coloring oxides, $TiO_2$, $V_2O_5$, $Cr_2O_3$, $MnO_2$, $Fe_2O_3$, $Co_2O_3$, $Ni_2O_3$, CuO, $CeO_2$, $NdO_2$ and $UO_2$. On account of their high PbO content such glasses cannot be melted with reducing agents nor with materials containing sulfides without becoming discolored with metallic lead or with lead sulfide.

For a better understanding of the invention and its utility reference is had to the accompanying drawing in which:

Fig. 1 is a side view, partly in section, of an arrangement for introducing a desired quantity of a molten colored soft glass 10 into a preheated clear hollow glass article such as a lamp bulb 11 resting on a rotatable support 12 and for revolving the support and the article by means of a variable speed motor 13 to spread the molten glass 10 by centrifugal force. A burner 14 is provided to keep the support 12 and the article 11 at a suitable temperature.

Figure 2:
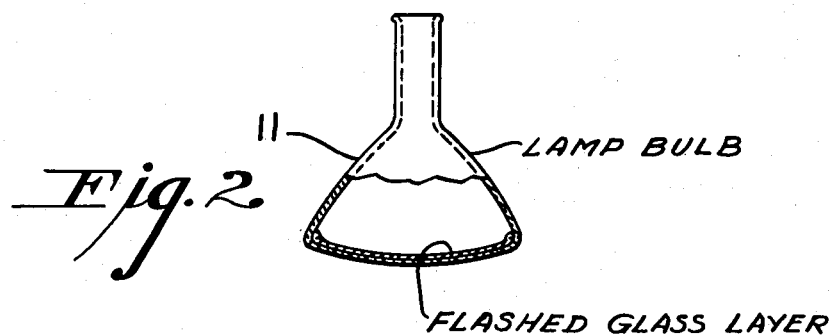

Fig. 2 is a side view of the hollow glass article or lamp bulb of Fig. 1 after it has been treated by the method according to the invention, the wall of the article being partly broken away to show the flashed layer of glass in exaggerated thickness uniformly spread on the inner surface of the article.

In practicing the new method the hollow glass article 11, in this instance a lamp bulb having an average wall thickness of about 1 mm. and a maximum diameter of about 12 cm. and composed of a soda-lime silicate glass having a strain point of 478° C., an annealing point of 510° C., a softening point of 696° C. and an expansion coefficient of $92 \times 10^{-7}$ per °C. (between 0° and 300° C.), is preheated to a temperature between 480 and 690° C. and is then placed on the rotatable support 12. About 20 to 30 g. of a molten colored glass having the specific base composition set forth above and heated to about 1,000° C. (viscosity about 1 poise) are immediately poured onto the center of the inner surface of the bulb 11 and the support 12 is rotated at first slowly and then at high speed until the molten glass has been distributed over the desired area of the inner surface of the bulb.

In case the inner surface of the article has an unsymmetrical contour caused, for example, by uneven wall thickness, we have found that a preliminary spreading of the molten glass by means of a metal tool applied briefly thereto while the article is being rotated slowly, causes uniform spreading of the molten glass when the speed of rotation is subsequently increased to its maximum.

The present invention has been found particularly useful in the production of colored lamp bulbs having a generally flat or substantially flat portion such as shown in the drawing. It is equally applicable, however, to the production of colored lamp bulbs of other configurations and to the production of other types of colored hollow glass articles. It is also applicable to the production of opal or light-diffusing glass articles through the use of an opacifiable molten glass.

The invention is also useful in the production of other than colored hollow glass articles as, for instance, the manufacture of a hollow glass article having a portion of its inner surface differing in one or more properties (e. g., electrical) from the balance of such surface.

What is claimed is:

1. The method of flashing, which comprises heating a previously formed hollow glass article to a temperature between its strain point and its softening point, said article having a generally flat portion, arranging such article with said flat portion generally horizontal and with its mouth uppermost, centrally depositing on the inner surface of the flat portion of such article a quantity of a molten glass having a softening point sufficiently below the annealing point of the glass article so that it can be maintained in a molten condition in contact with the article without causing excessive deformation or warping of said article and an expansion coefficient not differing by more than $10 \times 10^{-7}$ per °C. from that of the glass article, the viscosity of the molten glass being not over about 100 poises, and spreading the molten glass over said flat portion by rotating the article about a vertical axis passing centrally through such flat portion to cause the molten glass to flow under the influence of centrifugal force.

2. The method of flashing, which comprises heating a previously formed hollow glass article to a temperature between its strain point and its softening point, said article having a generally flat portion, arranging such article with said flat portion generally horizontal and with its mouth uppermost, centrally depositing on the inner surface of the flat portion of such article a quantity of a molten glass having a softening point sufficiently below the annealing point of the glass article so that it can be maintained in a molten condition in contact with the article without causing excessive deformation or warping of said article and an expansion coefficient not differing by more than $10 \times 10^{-7}$ per °C. from that of the glass article and comprising essentially 60% to 85% PbO, 5% to 15% $Al_2O_3$ and the indicated proportion of at least one glass-forming oxide selected from the group consisting of up to 40% $B_2O_3$ and up to 20% $SiO_2$, the sum of such essential oxides being over 80%, the viscosity of the molten glass being not over about 100 poises, and spreading the molten glass over said flat portion by rotating the article about a vertical axis passing centrally through such flat portion to cause the molten glass to flow under the influence of centrifugal force.

3. The method as claimed in claim 2, in which the previously formed hollow glass article is composed of a soda-lime silicate glass.

4. The method as claimed in claim 2, in which the molten glass contains a glass coloring oxide.

5. The method as claimed in claim 2 in which the molten glass is opacifiable.

References Cited in the file of this patent

UNITED STATES PATENTS

| | | |
|---|---|---|
| 1,870,363 | Jenkins | Aug. 9, 1932 |
| 2,539,410 | Essig | Jan. 30, 1951 |
| 2,569,852 | Green | Oct. 2, 1951 |